United States Patent
Huq et al.

(10) Patent No.: US 11,584,382 B2
(45) Date of Patent: Feb. 21, 2023

(54) SYSTEM AND METHOD FOR MALFUNCTON OPERATION MACHINE STABILITY DETERMINATION

(71) Applicants: Mohammed S Huq, Hamtramck, MI (US); Stephen Horton, Rochester, MI (US)

(72) Inventors: Mohammed S Huq, Hamtramck, MI (US); Stephen Horton, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 114 days.

(21) Appl. No.: 17/174,777

(22) Filed: Feb. 12, 2021

(65) Prior Publication Data
US 2022/0258750 A1    Aug. 18, 2022

(51) Int. Cl.
| | |
|---|---|
| B60W 50/00 | (2006.01) |
| B60W 50/02 | (2012.01) |
| B60W 60/00 | (2020.01) |
| B60R 16/023 | (2006.01) |
| B60W 50/04 | (2006.01) |
| H04L 12/40 | (2006.01) |

(52) U.S. Cl.
CPC ..... *B60W 50/0205* (2013.01); *B60R 16/0231* (2013.01); *B60W 50/04* (2013.01); *B60W 60/001* (2020.02); *H04L 12/40* (2013.01); *B60W 2050/021* (2013.01); *H04L 2012/40215* (2013.01); *H04L 2012/40273* (2013.01)

(58) Field of Classification Search
CPC ............ B60W 50/0205; B60W 50/04; B60W 60/001; B60W 2050/021; B60R 16/0231; H04L 12/40; H04L 2012/40215; H04L 2012/40273
See application file for complete search history.

(56) References Cited

U.S. PATENT DOCUMENTS

| | | | |
|---|---|---|---|
| 7,082,359 B2 | 7/2006 | Breed | |
| 8,918,541 B2 * | 12/2014 | Morrison | ............. G10H 1/0058 709/248 |
| 10,576,956 B2 | 3/2020 | Baehrle-Miller et al. | |

FOREIGN PATENT DOCUMENTS

EP    3761559 A1    1/2021

OTHER PUBLICATIONS

International Search Report and Written Opinion dated Apr. 20, 2022 for International Application No. PCT/US2022/015899 dated Feb. 10, 2022.

* cited by examiner

*Primary Examiner* — Ian Jen
(74) *Attorney, Agent, or Firm* — Ralph E. Smith

(57) ABSTRACT

A vehicle includes a controller area network (CAN) and a plurality of a controllers in communication with each other via the CAN, wherein each controller of the plurality of controllers is configured to time-stamp messages transmitted via the CAN using a vehicle-wide synchronized clock, determine a worst-case transmission delay via the CAN based on the time-stamps for messages received from other controllers of the plurality of controllers, and based on the worse-case transmission delay, set a dynamic recovery timer for a malfunctioning controller of the plurality of controllers to recover after its malfunction, wherein the dynamic recovery timer prevents a particular controller that was malfunctioning but has since recovered from being incorrectly designated as a malfunctioning controller in need of service.

18 Claims, 3 Drawing Sheets

SYSTEM AND METHOD FOR MALFUNCTON OPERATION MACHINE STABILITY DETERMINATION

FIELD

The present application generally relates to vehicle controller networks and, more particularly, to a system and method for malfunction operation machine stability determination.

BACKGROUND

Today's vehicles typically have a large quantity of controllers and multiple controllers could run redundant or very similar software routines. Non-limiting examples of these controllers include an engine control module, a brake control module, and a steering control module. Each of these controllers are in communication with each other via a controller area network (CAN). When one of these software routines malfunctions, the malfunction can be communicated to the other controllers such that they are aware that the particular controller/software routine is malfunctioning. After a malfunction, however, there is the possibility that the controller/software routine can recover and resume normal functionality. Conventional systems use a predetermined timer for this to occur. Due to transmission delays on the CAN, however, this predetermined time may be insufficient, which could result in a controller being designated as malfunctioning and needing service even though it has in fact recovered. Accordingly, while such vehicle controller networks do work for their intended purpose, there remains a desire for improvement in the relevant art.

SUMMARY

According to one example aspect of the invention, a vehicle is presented. In one exemplary implementation, the vehicle comprises a controller area network (CAN) and a plurality of a controllers in communication with each other via the CAN, wherein each controller of the plurality of controllers is configured to time-stamp messages transmitted via the CAN using a vehicle-wide synchronized clock; determine a worst-case transmission delay via the CAN based on the time-stamps for messages received from other controllers of the plurality of controllers, and based on the worse-case transmission delay, set a dynamic recovery timer for a malfunctioning controller of the plurality of controllers to recover after its malfunction, wherein the dynamic recovery timer prevents a particular controller that was malfunctioning but has since recovered from being incorrectly designated as a malfunctioning controller in need of service.

In some implementations, the dynamic recovery timer is set to a sum of a predetermined recovery time and the worse-case transmission delay. In some implementations, each controller of the plurality of controllers is configured to execute a redundant software routine that is the same or substantially similar to the redundant software routines executable by the remainder of the plurality of controllers. In some implementations, the redundant software routine is an autonomous driving or advanced driver assistance (ADAS) software routine.

In some implementations, each controller of the plurality of controllers is configured to operate as a state machine with one possible state being a malfunction state. In some implementations, the particular controller of the plurality of controllers is designated as a malfunctioning controller in need of service when the particular controller fails to recover from its malfunction before the expiration of the dynamic recovery timer. In some implementations, the dynamic recovery timer is a quantity of milliseconds. In some implementations, the dynamic recovery timer is a quantity of processor cycles. In some implementations, the plurality of controllers comprises at least an engine controller, a brake controller, and a steering controller.

According to another example aspect of the invention, a method of time-stamping messages in a vehicle controller network and setting a dynamic recovery timer for controller malfunction recovery is presented. In one exemplary implementation, the method comprises providing a CAN, providing a plurality of a controllers in communication with each other via the CAN, time-stamping, by each controller of the plurality of controllers, messages transmitted via the CAN using a vehicle-wide synchronized clock, determining, by each controller of the plurality of controllers, a worst-case transmission delay via the CAN based on the time-stamps for messages received from other controllers of the plurality of controllers, and based on the worse-case transmission delay, setting, by each controller of the plurality of controllers, a dynamic recovery timer for a malfunctioning controller of the plurality of controllers to recover after its malfunction, wherein the dynamic recovery timer prevents a particular controller that was malfunctioning but has since recovered from being incorrectly designated as a malfunctioning controller in need of service.

In some implementations, the dynamic recovery timer is set to a sum of a predetermined recovery time and the worse-case transmission delay. In some implementations, the method further comprises executing, by each controller of the plurality of controllers, a redundant software routine that is the same or substantially similar to the redundant software routines executable by the remainder of the plurality of controllers. In some implementations, the redundant software routine is an autonomous driving or ADAS software routine.

In some implementations, each controller of the plurality of controllers is configured to operate as a state machine with one possible state being a malfunction state. In some implementations, the method further comprises designating the particular controller of the plurality of controllers as a malfunctioning controller in need of service when the particular controller fails to recover from its malfunction before the expiration of the dynamic recovery timer. In some implementations, the dynamic recovery timer is a quantity of milliseconds. In some implementations, the dynamic recovery timer is a quantity of processor cycles. In some implementations, the plurality of controllers comprises at least an engine controller, a brake controller, and a steering controller.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DETAILED DESCRIPTION

As previously discussed, there remains a need for improvement in the art of controller networks, particularly in relation to controller malfunction recovery. Conventional controller networks utilize a predetermined recovery timer during which a controller is able to recover from a malfunction. The term "malfunction" as used herein refers to a fault or failure of a particular controller, such as a fault or failure of a particular software routine being executed. Due to transmission delays on a controller area network (CAN), however, this predetermined timer may be insufficient, which could result in a controller being designated as malfunctioning and in need of service even though it has in fact recovered.

Accordingly, improved controller network systems and methods are presented. These systems and methods utilize a vehicle-wide synchronized clock to time-stamp messages transmitted between controllers on the CAN. These time-stamps are used to determine a worst-case transmission delay, which is then utilized to set a dynamic recovery timer for controller malfunction recovery. The potential benefit is preventing or mitigating the incorrect designation of a controller as malfunctioning and needing service even though it has in fact recovered.

Figure 1:
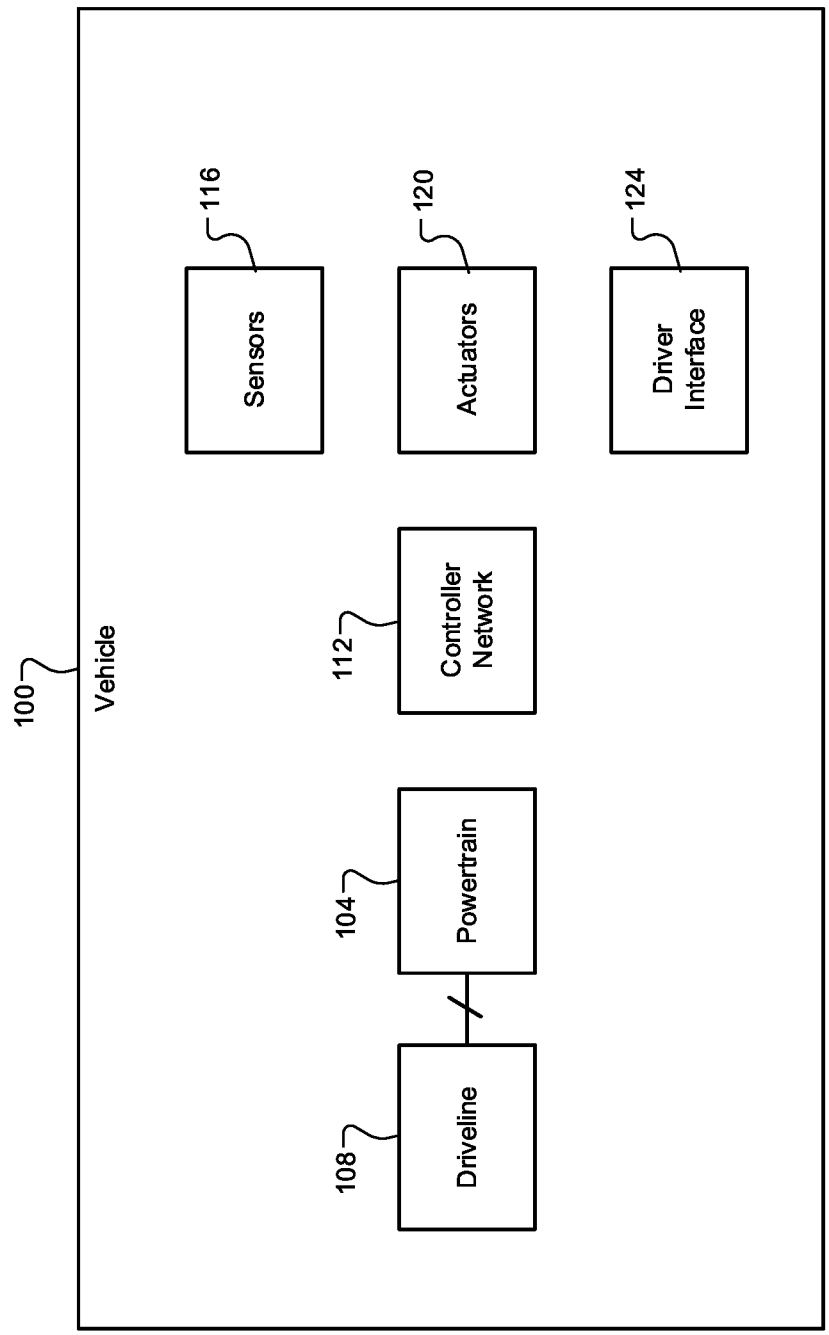
FIG. 1 is a functional block diagram of an example vehicle having a controller network according to the principles of the present application.

Referring now to FIG. 1, a functional block diagram of an example vehicle 100 according to the principles of the present application is illustrated. The vehicle 100 generally comprises a powertrain 104 (e.g., an engine, an electric motor, or combinations thereof and a transmission) that generates and transfers drive torque to a driveline 108. A controller network 112 comprises a plurality of controllers in communication via a CAN (not shown) to control operation of the vehicle 100. The vehicle 100 further comprises a set of sensors 116 (speed sensors, RADAR/LIDAR sensors, cameras, etc.) and a set of actuators 120 (brake actuator, steering actuator, air/fuel/spark actuators, etc.) and a driver interface 124 for gathering input data, generating outputs, and communicating information to and receiving input from a driver of the vehicle 100. For example, the driver may provide a driver torque request via an accelerator pedal, which is then used to control the powertrain 104 such that the driver torque request is met. It will be appreciated that these are merely examples of components of the vehicle 100 and that the vehicle 100 will likely include a plurality of additional components.

Figure 2A:
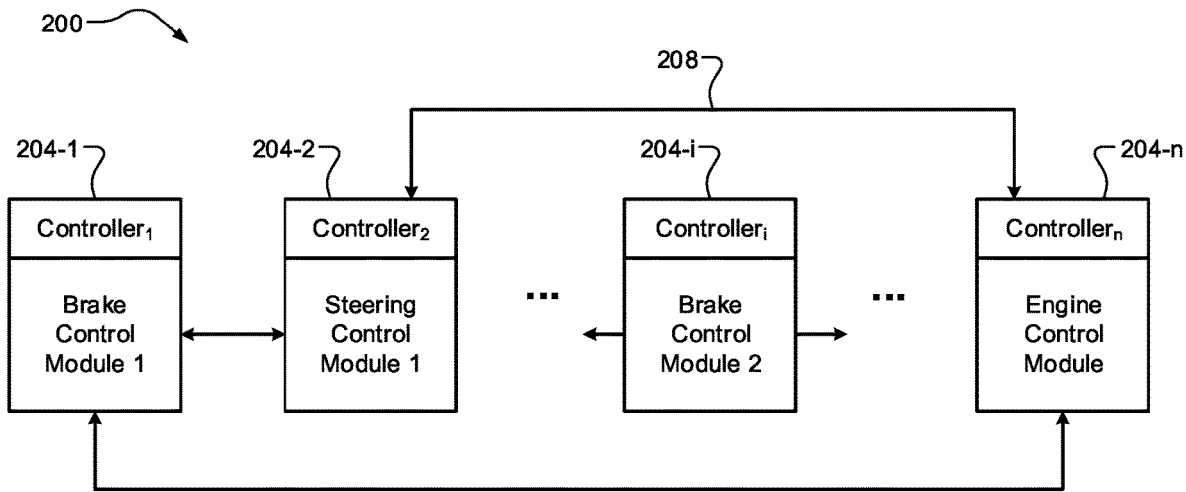
FIGS. 2A-2B are a functional block diagram of an example controller network and an example controller state machine diagram according to the principles of the present application.
Figure 2B:
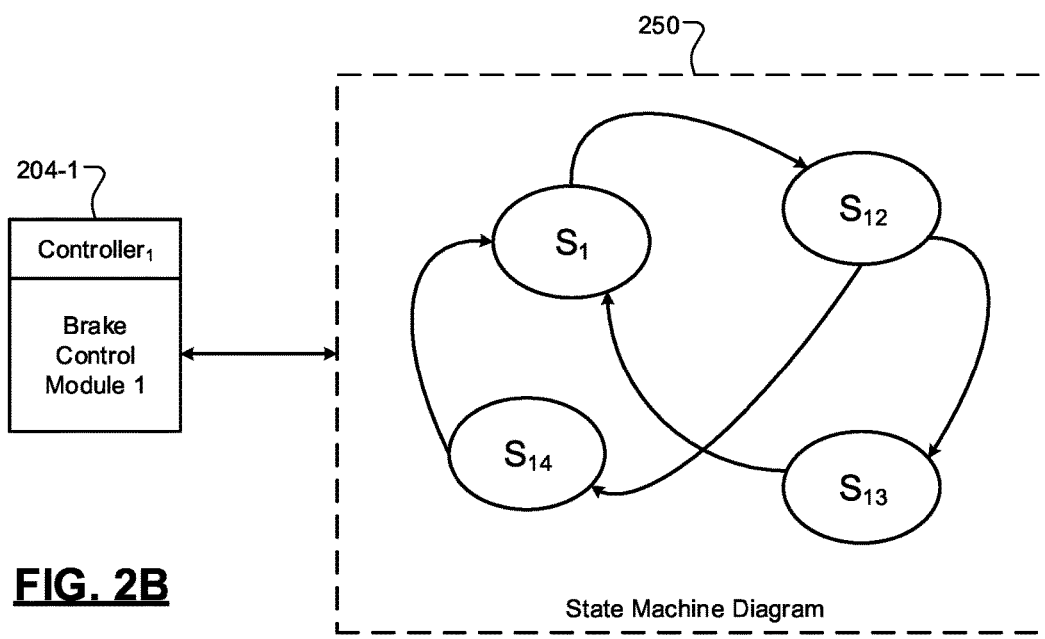

Referring now to FIGS. 2A-2B, a functional block diagram of an example controller network 200 and an example controller state machine diagram 250 according to the principles of the present application are illustrated. As shown, the controller network 200 includes controllers 204-1 . . . 204-n (hereinafter, "controllers 204"), where n is an integer greater than or equal to four. In the illustrated example, the first controller 204-1 (Controller$_1$) comprises a first instance of a brake control module (Brake Control Module 1). It will be appreciated that the term "module" as used herein refers to a portion of a controller or a software routine. For example, multiple versions of a same module (or substantially similar modules) could be implemented by different controllers to improve system redundancy, which could be particularly important for autonomous driving and ADAS features.

The second controller 204-2 (Controller$_2$) comprises a first instance of a steering control module (Steering Control Module 1). An i$^{th}$ controller 204-i (Controller$_i$, where i is an index integer between 1 and n) comprises a second instance of the brake control module (Brake Control Module 2). As previously discussed, this could be the same or a substantially similar software routine as the first instance of the brake control module—Brake Control Module 1. Lastly, the n$^{th}$ controller 204-n (Controller$_n$) comprises an engine control module. This could be, for example, the only instance of this particular module. Each of these controllers 204 is in communication via the CAN 208, which could include, for example only, a system of network cables/wires.

Referring now to FIG. 2B, each controller 204 (or its respective module or software routine) may be described as operating one or more state machines. This is because each controller/module has memory as it knows what it is currently doing and thus can also decide what is should be doing next based on a combination of its current state and incoming stimulus or inputs. One possible state could be a malfunction state. As previously discussed herein, this malfunction state could be recoverable in that the state machine could eventually recover by transitioning back to a non-malfunctioning or stable state. As shown in FIG. 2B, a state machine diagram 250 relative to the first controller 204-1 comprising the first instance of the brake control module—Brake Control Module 1—is illustrated. This state machine diagram 250 comprises four stable states—S1, S12, S13, and S14—and the arrows therebetween illustrate the order in which the state machine transitions between these different stable states.

The techniques of the present application allow for dynamic adjustment the time duration needed to apply checking the achievement of stability in a state machine. After stability is detected, the system (e.g., an autonomous or ADAS feature) is able to proceed with its engagement, disengagement, or partial or complete malfunction operation. Non-limiting examples of autonomous/ADAS features include adaptive cruise control (ACC), lane centering, lane keeping, as well as higher-level (L3 or L4) autonomous driving modes.

Figure 3:
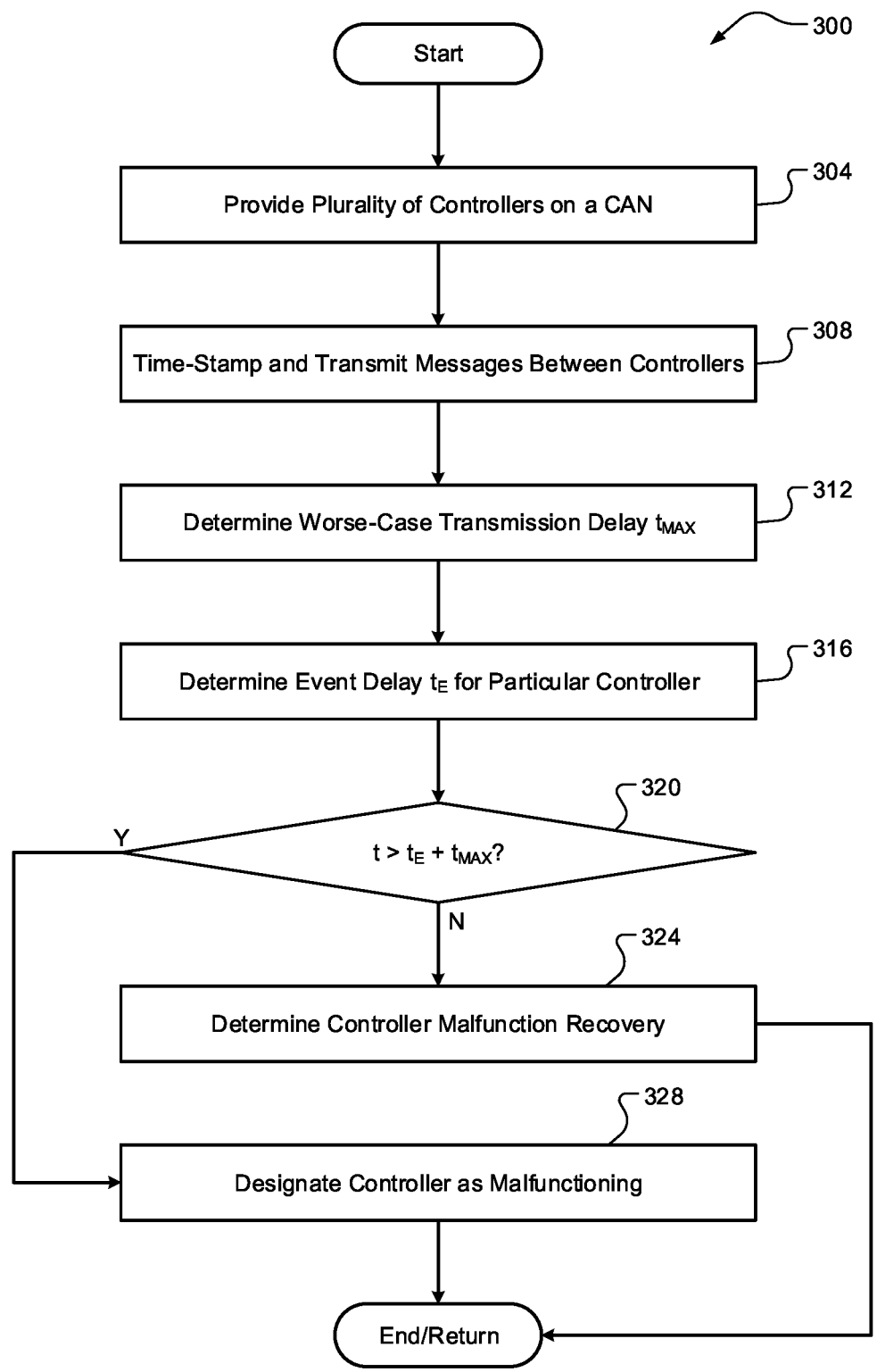
FIG. 3 is a flow diagram of an example method of time-stamping messages in a vehicle controller network and setting a dynamic recovery timer for controller malfunction recovery according to the principles of the present application.

Referring now to FIG. 3, a flow diagram of an example method 300 of time-stamping messages in a vehicle controller network and setting a dynamic recovery timer for controller malfunction recovery according to the principles of the present application is illustrated. While the components of vehicle 100 are specifically referenced, it will be appreciated that the method 300 could be applicable to any suitable vehicle having a plurality of controllers on a CAN running redundant modules of software routines. At 304, a plurality of controllers 204 on a CAN 208 are provided. At 308, the plurality of controllers 204 time-stamp messages using a vehicle-wide synchronized clock and transmit the messages between each other via the CAN 208.

At 312, each controller 204 determines a worst-case transmission delay ($t_{MAX}$) via the CAN 208 (e.g., between two particular controllers). At 316, each controller 204 determines the event delay ($t_E$) for a particular event (E; e.g. a particular cycle of a module or software routine). This could involve, for example, using a look-up table having predetermined delays for different types of events for each different controller 204. For example, some of the plurality of controllers 204 may have greater processing power than others of the plurality of controllers 204 and thus a greatest/longest event delay $t_E$ could be selected.

At 320, each controller 204 determines whether a recovery time (t) for a particular controller 204 exceeds a sum of the event delay $t_E$ and the worst-case transmission delay $t_{MAX}$. These time values could be either time-based (e.g., a quantity of milliseconds) or cycle-based (e.g., a quantity of processor cycles). When false, it is determined that the particular controller 204 that was potentially malfunctioning has recovered from its malfunction at 324 and the method 300 then ends or returns to 304 or 308 for another cycle. When true, however, the particular controller 204 is designated as malfunctioning and in need of service and some remedial action could be taken (e.g., autonomous/ADAS feature partial or full disengagement) and the method 300 ends until the malfunction is cleared during servicing.

It will be appreciated that the term "controller" as used herein refers to any suitable control device(s) that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle, comprising:
    a controller area network (CAN); and
    a plurality of a controllers in communication with each other via the CAN, wherein each controller of the plurality of controllers is configured to:
        time-stamp messages transmitted via the CAN using a vehicle-wide synchronized clock;
        determine a worst-case transmission delay via the CAN based on the time-stamps for received messages; and
        based on the worse-case transmission delay, set a dynamic recovery timer for a malfunctioning controller of the plurality of controllers to recover after its malfunction,
        wherein the dynamic recovery timer prevents a particular controller that was malfunctioning but has since recovered from being incorrectly designated as a malfunctioning controller in need of service.

2. The vehicle of claim 1, wherein the dynamic recovery timer is set to a sum of a predetermined recovery time and the worse-case transmission delay.

3. The vehicle of claim 1, wherein each controller of the plurality of controllers is configured to execute a redundant software routine that is the same or substantially similar to the redundant software routines executable by the remainder of the plurality of controllers.

4. The vehicle of claim 3, wherein the redundant software routine is an autonomous driving or advanced driver assistance (ADAS) software routine.

5. The vehicle of claim 1, wherein each controller of the plurality of controllers is configured to operate as a state machine with one possible state being a malfunction state.

6. The vehicle of claim 1, wherein the particular controller of the plurality of controllers is designated as a malfunctioning controller in need of service when the particular controller fails to recover from its malfunction before the expiration of the dynamic recovery timer.

7. The vehicle of claim 1, wherein the dynamic recovery timer is a quantity of milliseconds.

8. The vehicle of claim 1, wherein the dynamic recovery timer is a quantity of processor cycles.

9. The vehicle of claim 1, wherein the plurality of controllers comprises at least an engine controller, a brake controller, and a steering controller.

10. A method of time-stamping messages in a vehicle controller network and setting a dynamic recovery timer for controller malfunction recovery, the method comprising:
    providing a controller area network (CAN);
    providing a plurality of a controllers in communication with each other via the CAN;
    time-stamping, by each controller of the plurality of controllers, messages transmitted via the CAN using a vehicle-wide synchronized clock;
    determining, by each controller of the plurality of controllers, a worst-case transmission delay via the CAN based on the time-stamps for received messages; and
    based on the worse-case transmission delay, setting, by each controller of the plurality of controllers, a dynamic recovery timer for a malfunctioning controller of the plurality of controllers to recover after its malfunction,
    wherein the dynamic recovery timer prevents a particular controller that was malfunctioning but has since recovered from being incorrectly designated as a malfunctioning controller in need of service.

11. The method of claim 10, wherein the dynamic recovery timer is set to a sum of a predetermined recovery time and the worse-case transmission delay.

12. The method of claim 10, further comprising executing, by each controller of the plurality of controllers, a redundant software routine that is the same or substantially similar to the redundant software routines executable by the remainder of the plurality of controllers.

13. The method of claim 12, wherein the redundant software routine is an autonomous driving or advanced driver assistance (ADAS) software routine.

14. The method of claim 10, wherein each controller of the plurality of controllers is configured to operate as a state machine with one possible state being a malfunction state.

15. The method of claim 10, further comprising designating the particular controller of the plurality of controllers as a malfunctioning controller in need of service when the particular controller fails to recover from its malfunction before the expiration of the dynamic recovery timer.

16. The method of claim 10, wherein the dynamic recovery timer is a quantity of milliseconds.

17. The method of claim 10, wherein the dynamic recovery timer is a quantity of processor cycles.

18. The method of claim 10, wherein the plurality of controllers comprises at least an engine controller, a brake controller, and a steering controller.

* * * * *